B. FRANKENFIELD.
METHOD OF AND MEANS FOR SECURING IN POSITION CONDUCTORS OF ELECTROMAGNETIC STRUCTURES.
APPLICATION FILED MAY 3, 1906.
911,713. Patented Feb. 9, 1909.
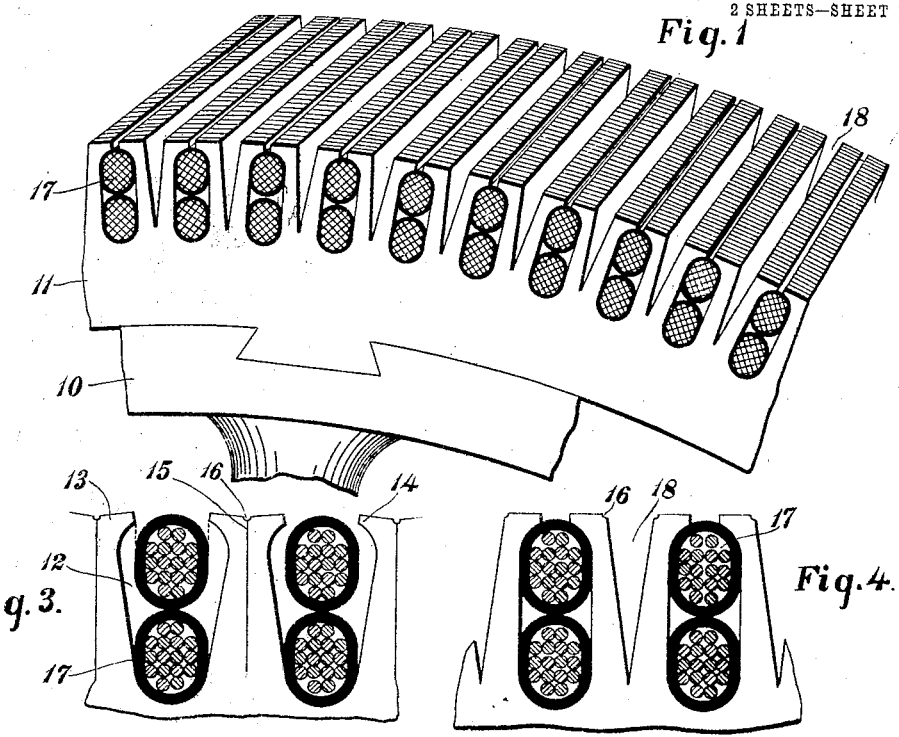
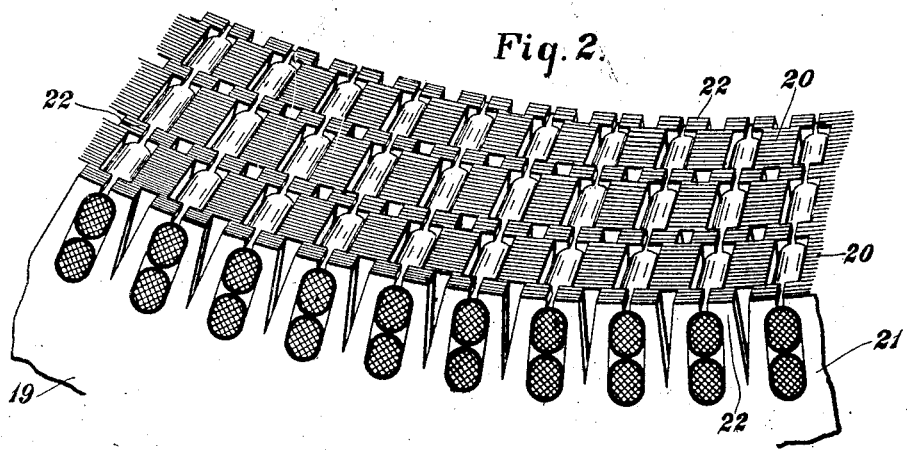
WITNESSES
INVENTOR
Budd Frankenfield
By
Chas. E. Lord
ATTORNEY

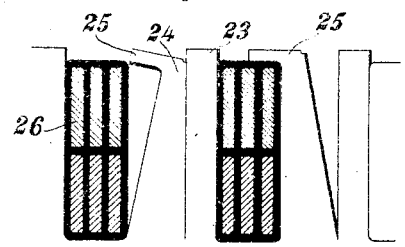
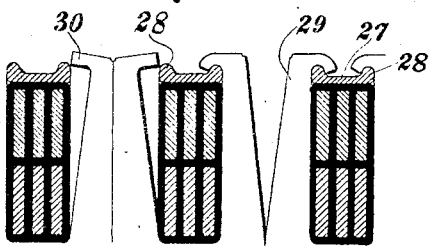
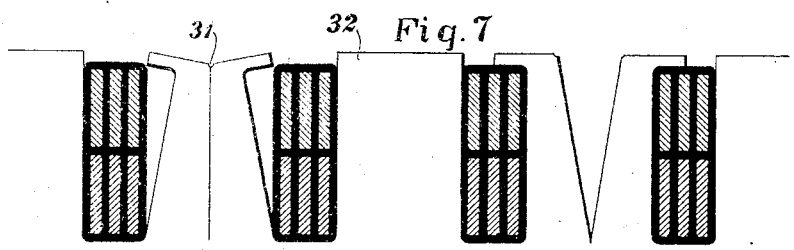
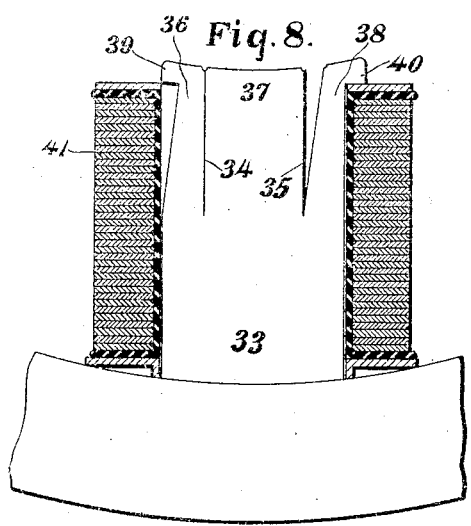
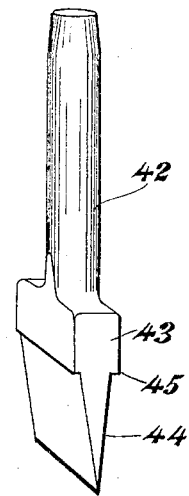

UNITED STATES PATENT OFFICE.

BUDD FRANKENFIELD, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

METHOD OF AND MEANS FOR SECURING IN POSITION CONDUCTORS OF ELECTROMAGNETIC STRUCTURES.

No. 911,713.     Specification of Letters Patent.     Patented Feb. 9, 1909.

Application filed May 3, 1906. Serial No. 314,922.

*To all whom it may concern:*

Be it known that I, BUDD FRANKENFIELD, citizen of the United States, residing at Norwood, in the county of Hamilton and State of Ohio, have invented certain new and useful Improvements in Methods of and Means for Securing in Position Conductors of Electromagnetic Structures, of which the following is a full, clear, and exact specification.

My invention relates to the method of and means for securing in position the current carrying conductors of electromagnetic structures, such as armature coils and field coils.

Armature cores both of the stationary and rotary type are usually provided with open coil-slots forming straight teeth or with closed or partially closed slots forming T-shaped teeth. When the core is provided with open slots, the coils, which are generally form wound, are held in position by non-magnetic "sticks" or wedges usually made of wood which engage slots provided near the ends of the teeth, and in the case of rotary members by wire bands. When the core is provided with closed slots the armature conductors are strung through the slots and are held in position by the overhanging portions of the teeth.

In the open slot construction, the coils can be easily and quickly assembled, can be more perfectly insulated from the core and can be easily removed for repairs. The construction is, however, mechanically weak, especially in rotary members. Furthermore, the core being provided with deep open slots, as the teeth are revolved before the field coils, or as the field poles are revolved before the teeth, the lines of force from the poles are arranged in "tufts" which rapidly shift from tooth to tooth as the teeth approach and recede from a pole, causing considerable vibration and a disagreeable humming. This construction has the further disadvantage that a great deal of time and labor is required for driving the sticks in position.

The construction having the closed or partially closed slots is mechanically stronger than the first construction, and also since the iron of the core is more evenly distributed over the periphery, the magnetic reluctance of the air gap is less and the vibration and humming is less. The disadvantages are that since the conductors must be strung through the slots from end to end of the core, much time and labor must be expended in winding the machine, the conductors can not be insulated effectively, and can not be easily removed in case repairs are necessary, and since the conductors are entirely or almost entirely surrounded by iron the self induction of the coils is considerable.

Field coils are usually held in position by end plates or collars secured to the ends of the poles. This method while satisfactory generally is expensive and requires the expenditure of considerable time and labor for the assembly.

The object of my invention is to provide a method and means for fastening in position current carrying coils of dynamo-electric machines securely and with facility, and in such a manner that the coils can be easily removed in case repairs are necessary.

In one aspect, my invention consists in the method of securing in position a current carrying coil or conductor, as an armature coil or field coil, by bending a portion of the flux carrying metal such as a portion of the tooth or pole over the coil or conductor.

In another aspect my invention consists in a dynamo-electric machine having a laminated slotted core, conductors or coils in the slots of the core, part or all of the laminæ having teeth which are split at the ends and spread apart over the conductors or coils so as to secure the latter in position.

My invention still further consists in the details of construction and combinations of elements described in the specification, and set forth in the appended claims.

For a better understanding of my invention, reference is had to the accompanying drawing in which—

Figure 1 is a perspective, parts being in section, of a portion of a rotary member equipped with my invention; Fig. 2 is a perspective, parts being in section, of a portion of a stationary member equipped with a slightly modified form of my invention; Fig. 3 is an enlarged detail view of the teeth shown in Figs. 1 and 2 before the ends are bent over the coils; Fig. 4 is a similar view showing the teeth bent over the coils; Fig. 5 is a similar view of a modification in which one portion of each tooth is bent over a coil; Fig. 6 is a similar view of a further modification in which means is provided for preventing the teeth from accidentally bending back away from the coils; Fig. 7 is a similar view showing a still further modification in which the ends of the alternate teeth are split and bent over the coils; Fig. 8 shows my invention applied to a field coil; and Fig. 9 shows a tool which may be employed for spreading the ends of the teeth or pole pieces.

Referring now to the Figs. 1, 3 and 4 of the drawings I have shown at 10 a portion of a rotary spider or frame to which the laminated core 11 is secured. The laminæ of the core are provided with slots 12 and teeth 13. The teeth are of unusual shape, being punched as shown in Fig. 3. The teeth are narrow near the ends and have laterally extending projections 14, the space between adjacent projections being sufficient to permit a coil to be inserted. The teeth are split or cut as at 15, preferably by a die when punched, and are preferably provided with small notches 16 for the insertion of a spreading tool, as will be explained. The coils 17 are inserted in the slots thus formed and the ends of the split teeth are then spread or bent over the coils to retain the coils in position (as shown in Figs. 1 and 4), forming thereby wedge-shaped slots 18 in the center of the teeth. It is seen that the coils can be easily placed in the slots and the ends of the teeth can with facility be bent over the coils, securely holding the latter in position. If it is desired to remove the coils in case repairs are necessary the ends of the teeth can be easily bent away from the coils so that they can be lifted from the slots. In practice I find that this operation can be repeated many times without breaking the teeth. This construction is strong mechanically, there being little danger of the parts being displaced even at high speeds. In this figure all the teeth across the entire core are split and bent over the coils. It is evident, however, that the coils can be held in position by the teeth of only part of the laminæ arranged at intervals across the core, as is shown in the stationary armature of Fig. 2. In the construction shown in Fig. 1, the teeth are split up into parts and hence the metal is more uniformly distributed over the periphery than in the usual construction in which straight teeth or open slots are employed and hence the tufting of the flux and the consequent humming is less, and the air gap reluctance is less. Because of this, the construction of Fig. 1 is especially applicable to primary elements and to wound secondary elements of induction motors.

In Fig. 2 I have shown a slight modification. A stationary laminated core shown at 19, is provided with laminæ having open slots and ordinary straight teeth 20, which laminæ form the main portion of the core, and with laminæ 21 provided with split teeth 22 similar to those shown in Fig. 1. The laminæ 22 are preferably arranged in groups at intervals along the core as is shown. The coils are placed in position in the slots and then the split teeth 22 of the laminæ 21 are bent over the coils as in the previous construction. Thus the coils are securely held in position and in a manner which will permit the ready assembly or removal of the coils. With this construction, since the core is provided in great part with open slots, the self inductance of the coils is small, making this arrangement particularly advantageous in commutating machines, alternating current generators, and synchronous motors. If desired the teeth having the coil retaining projections may be slightly longer than and project above the teeth of the main laminæ, to increase the magnetic reluctance and to decrease the self inductance.

In Fig. 5 I have shown a modification of my invention. In this case the teeth are split but are of different shape than in the first construction, each having one straight side or portion 23, and one side 24 provided with a lateral projection 25, which before being bent permits the insertion of the coil 26 as shown at the left side of the figure. After the coil is inserted in the slot, the portion of the tooth having the projection is bent over the coil, the other side remaining unbent as shown at the right side of the figure.

In Fig. 6 is shown a means for preventing the teeth from being accidentally bent back to their original positions. Strips or blocks 27 having at the sides flanges 28, are placed in the slots above the coils. The teeth 29 which are of the same construction as shown in Figs. 1, 2, 3 and 4 are spread over the strips or blocks 27, and the ends of the projections 30 are bent over the flanges 28 as shown at the right side of Fig. 6. This construction may be employed whenever from any cause the teeth are in any danger of being bent back to their original positions.

In Fig. 7 the laminæ are provided with alternately arranged split teeth 31, and straight teeth 32. With this construction less time is required to secure the coils in position than in the previously described constructions.

In Fig. 8 I have shown my invention applied to a field magnet. The laminæ 33 of the pole are split at both sides at 34 and 35, dividing the end of the pole in three portions 36, 37 and 38, the side portions having projections 39 and 40. After the coil 41 is placed in position the side portions are bent laterally so that the projections extend over the face of the coil and serve to retain the coil in position. Thus the usual coil seats or end collars are dispensed with.

In Fig. 9 I have shown at 42 a tool for spreading the teeth or pole pieces. The tool is provided with a head 43 having a wedge-shaped portion 44 and shoulders 45. The purpose of the shoulders 44 is to engage the teeth after the latter have been spread a sufficient amount so that the laminæ of all the teeth will be spread uniformly, thus avoiding the danger of some of the laminæ being spread so far as to injure the insulation. If desired the insulation may be reinforced under the coil retaining projections.

It is seen that my invention is susceptible of various modifications and changes.

I do not wish to be confined to the exact details shown, to any of the modifications, or to any particular type of machine but aim in my claims to cover all modifications which do not involve a departure from the spirit and scope of my invention.

What I claim as new and desire to secure by Letters Patent is:—

1. The method of securing a coil to a laminated core, which consists in bending the laminæ in groups over the coil.

2. The method of securing a coil in a slotted core, consisting in bending a portion of the adjacent complete tooth over the coil.

3. The method of securing a coil in a laminated core, consisting in assembling the core, putting the coil in place, and then bending laminæ over the coil.

4. The hereindescribed method, consisting in slitting or cutting the teeth of an armature core, placing the coils in the slots between the teeth, and bending portions of the teeth over the coils.

5. The hereindescribed method, consisting in slitting or cutting teeth of laminæ of a core, placing the coils in the slots between the teeth, and bending the ends of the slit or cut laminæ over the coils.

6. The hereindescribed method, consisting in assembling a laminated toothed core, putting a conductor in a slot between two teeth of said core and then bending part of a tooth of the core over the conductor.

7. In a dynamo-electric machine, a slotted laminated core, coils in the slots of the core, groups of laminæ being bent over the coils to retain the latter in position.

8. In a dynamo-electric machine, a laminated core, said core having teeth which are split or cut, and coils between said teeth, said teeth being bent over the coils to retain the latter in position.

9. In a dynamo-electric machine, a laminated core having teeth, the ends of which are split or cut, coils in the slots of the core, the ends of the split teeth being spread or forced apart so as to extend over the coils.

10. In a dynamo-electric machine, a flux carrying member having a laminated projection, said projection having its free end split or cut, and a conductor associated with the projection, the parts of the projection being spread apart so as to extend over and retain said conductor in position.

11. As an article of manufacture, a lamina for an armature core having teeth each provided with a coil retaining projection, the teeth being split or cut, and the width of the teeth at their outer ends being substantially the same as at their bases.

12. As an article of manufacture, a lamina for armature cores having slots, and teeth provided with coil retaining projections, the width of the teeth at the outer ends being substantially the same as at the inner ends.

13. As an article of manufacture, a lamina for armature cores having slots, and teeth provided with coil retaining wedges, the teeth being split or cut, and the width of the teeth at the outer ends across the projections being substantially the same as at the inner ends.

14. The method of securing a conductor in a laminated core which consists in bending laminæ of the core edgewise over the conductor.

15. The method of forming electromagnetic structures, which consists in slitting or cutting teeth of laminæ of a core, placing conductors in the slots between the teeth, and bending the ends of the slit or cut laminæ in their own planes over the conductors.

16. In a dynamo-electric machine, a slotted laminated core, conductors in the slots of the core, laminæ of the core being bent edgewise over the conductors to retain the latter in position.

17. In a dynamo-electric machine, a laminated core having teeth, conductors in the slots formed by said teeth, laminæ of teeth of said core being split or cut and bent in their own planes over the conductors to retain the latter in position.

18. As an article of manufacture, a lamina for cores having teeth provided with coil-retaining projections, the width of the slots between adjacent teeth being substantially the same at the inner and outer ends.

19. As an article of manufatcure, a toothed lamina for cores, the width of the teeth at the outer and inner ends being substantially the same while the width of the teeth at an intermediate point is less than at the ends.

20. The method of securing coils in proper position relative to a laminated core, consisting in slitting laminæ of the core, placing the coils in proper position, and bending parts of the slit laminæ edgewise over the coils.

21. The method of securing a conductor in proper position relative to a laminated core, consisting in bending a portion of a lamina of the core in its own plane over the conductor.

In testimony whereof I affix my signature, in the presence of two witnesses.

BUDD FRANKENFIELD.

Witnesses:
ARTHUR F. KWIS,
FRED J. KINSEY.